United States Patent
Oosterhout et al.

(10) Patent No.: US 7,102,773 B1
(45) Date of Patent: Sep. 5, 2006

(54) METHOD FOR MULTICAST OF DOCUMENTS

(75) Inventors: Jack Van Oosterhout, Camas, WA (US); Octavio Todd Garcia, Tigard, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 871 days.

(21) Appl. No.: 09/618,867

(22) Filed: Jul. 19, 2000

(51) Int. Cl.
*G06F 15/00* (2006.01)
*G03G 15/00* (2006.01)

(52) U.S. Cl. .................... 358/1.15; 358/1.13
(58) Field of Classification Search .............. 358/1.15, 358/1.16, 402, 403, 468, 1.11–1.14, 296, 358/1.1, 1.9, 1.17, 1.18; 399/1; 379/100.15
See application file for complete search history.

(56) References Cited

U.S. PATENT DOCUMENTS

| 4,493,049 | A | | 1/1985 | Donohue et al. |
|---|---|---|---|---|
| 5,517,494 | A | | 5/1996 | Green |
| 5,727,002 | A | | 3/1998 | Miller et al. |
| 5,835,723 | A | | 11/1998 | Andrews et al. |
| 5,897,260 | A | * | 4/1999 | Zingher ....................... 400/719 |
| 6,091,507 | A | * | 7/2000 | Vatland et al. .............. 358/1.15 |
| 6,166,826 | A | * | 12/2000 | Yokoyama .................. 358/1.16 |
| 6,469,796 | B1 | * | 10/2002 | Leiman et al. .............. 358/1.15 |
| 6,529,286 | B1 | * | 3/2003 | King ........................... 358/1.14 |
| 6,552,813 | B1 | * | 4/2003 | Yacoub ........................ 358/1.1 |
| 6,707,566 | B1 | * | 3/2004 | Endoh ......................... 358/1.15 |
| 2002/0101604 | A1 | * | 8/2002 | Mima et al. ................ 358/1.15 |

FOREIGN PATENT DOCUMENTS

| JP | 01-185427 | | 7/1989 |
|---|---|---|---|
| JP | 05073232 A | * | 3/1993 |
| JP | 11296333 A | * | 10/1999 |

* cited by examiner

*Primary Examiner*—Gabriel Garcia
*Assistant Examiner*—Thierry L. Pham
(74) *Attorney, Agent, or Firm*—Marger Johnson & McCollom, P.C.

(57) ABSTRACT

A method for multicasting of documents. The host receives the document data, including a number of documents to be created. The host then divides the number of documents to be created into batches and formats the data into a print job. The information about the batches and assignments to printers in the cluster is embedded into the print job. The host then transmits the print job for production of the documents.

19 Claims, 2 Drawing Sheets

METHOD FOR MULTICAST OF DOCUMENTS

BACKGROUND

1. Field

This disclosure relates to production of hard copy output using clustered devices, more particularly to a method for delivering the data for hard copy output using multicasting.

2. Background

It is possible to produce one large copying or printing task on several devices. A host application assigns a portion of a print or copy task to one of several devices. The several devices are connected via a network. A group of such devices are referred to as a cluster. The devices may be printers, copiers or printer/copiers, as well as other combinations of functions, such as printer/copier/fax, etc. Regardless of the individual capabilities of the devices, they are part of a cluster and so will be referred to as clustered devices. Additionally, this invention relates to production of hard copy output, so the devices may also be referred to as printers, which will include copiers and fax machines within its definition.

Similarly, the task which the clustered devices are assigned may be a print job, where the original data to be produced as hard copy output is generated from an application running on a computer. Alternatively, it may be a copy job, where the data to be produced as hard copy is generated by a scanning device. The scanning device may be part of a copying apparatus, such as a copier, or may be a stand alone. In either case, however, the goal is to produce a hard copy output of the data. For that reason, these tasks will be referred to as print jobs, regardless of the source of data to be rendered by the print engine.

Currently, a large job that is to be produced by clustered devices must be transmitted to each device individually in most local area networks (LANs) such as an Ethernet. The Ethernet network is a simple bus structure where every device on the network sees all of the information transmitted over the network. However, only the device to which that information is addressed actually acquires the data to act upon it.

One variation from this approach is discussed in U.S. Pat. No. 4,493,049, issued Jan. 8, 1985. In this approach, print data is converted into an output marker bit stream and saved to disc. The stored bit streams are then retrievable from the disc by other devices. However, the step of saving to disc adds another layer of complexity not necessary in the current state of networks. Current networks do not suffer from the problems of lost data or multiple accesses to the same data this approach was designed to overcome. Therefore, the extra step is no longer necessary and is not an efficient solution to the problem. Further, for the data to be accessed by multiple devices, the data still has to be transferred across the network as individual data streams, contributing to the problems discussed above.

Some devices vary from the point to point approach discussed above, such as network sniffers. Sniffers glean information from the network typically by recording all traffic for later analysis. However, for the most part, devices on networks similar to the Ethernet require data to be addressed to them specifically. An example of this is shown in prior art FIG. 1.

The host application, server 10 in this example, sends data to each of the printers 12a–12n. Each printer requires the data to be individually addressed, so the arrows represent the same print job being sent to each printer. This results in a high volume of repeated traffic.

One area in which a solution may lie is multicasting. A multicast is a broadcast of data to several devices on a network. The addressing is handled in such a way that the data is received by several devices, although it was only sent once. Several patents address various issues with multicasting.

Allocation of addresses for multicast participants is addressed in U.S. Pat. No. 5,835,723, issued Nov. 10, 1998. U.S. Pat. No. 5,517,494, issued May 14, 1996, addresses multicasting protocols in network routers. Neither of these approaches discloses a solution to the clustered printing issues discussed above.

U.S. Pat. No. 5,727,002 addresses the problems of transmission loss in multicast transmissions. The system disclosed provides for acknowledgements to be transmitted across a frame relay network to confirm reception of frames sent by multicasting. While this solution addresses the reduction in transmission by multicasting, it does not provide any relief to the lack of multicasting availability for clustered printers.

SUMMARY

One embodiment of the invention is a method for multicasting of documents. The method includes receiving document data to be printed at a host, where the document data includes a number of documents to be created. The host then divides the number of documents to be created into at least two batches for at least two corresponding, separate printers. The host formats the data into a print job, embeds information for distribution of the batches to the corresponding printers into the print job and transmit the job.

Another embodiment of the invention is a computer readable medium containing software code that performs all the steps of the method.

Another embodiment of the invention is a network device including a port for receiving document data, a processor for processing the document data into a print job, and a port for transmitting the print job.

BRIEF DESCRIPTION OF THE DRAWINGS

The invention may be best understood by reading the detailed description with reference to the drawing(s), wherein.

DETAILED DESCRIPTION OF THE EMBODIMENTS

Figure 1:
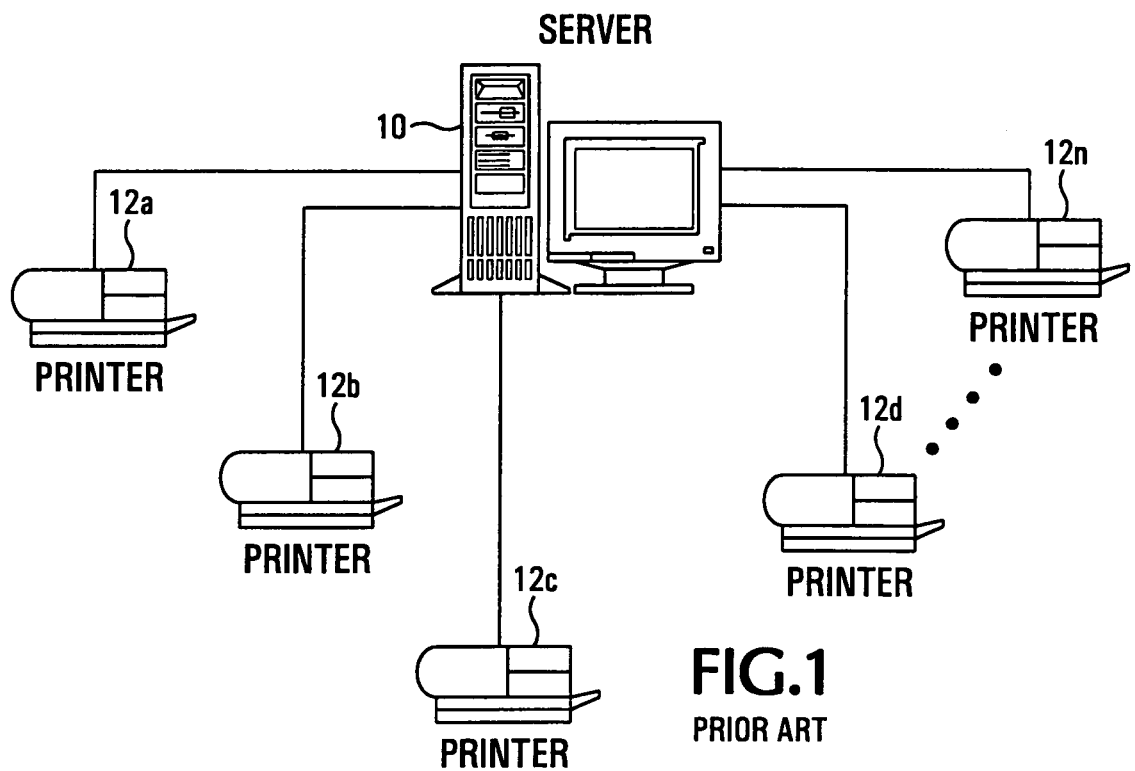
FIG. 1 shows a prior art network used for cluster printing.
Figure 2:
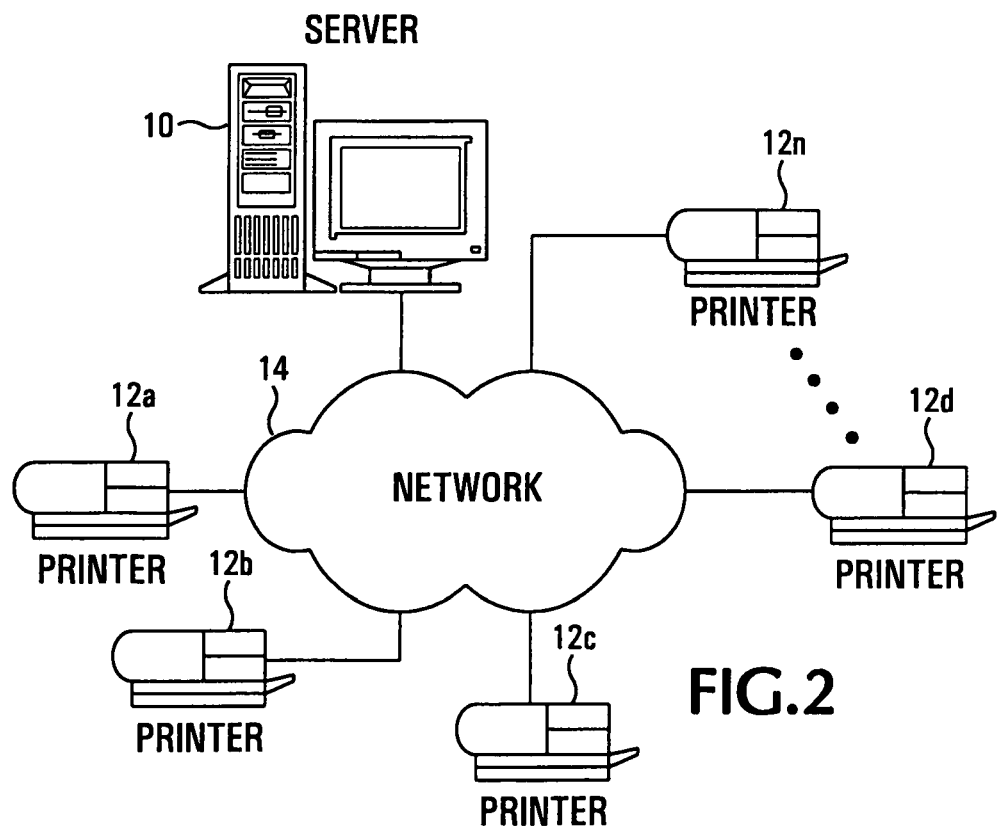
FIG. 2 shows one embodiment of a network used for cluster printing, in accordance with the invention.

FIG. 2 shows one embodiment of a network diagram to be used for multicasting of print jobs in accordance with the invention. It can be compared to FIG. 1. In FIG. 1, as discussed previously, the server must transmit the entire print job to each printer individually. The number of hard copy outputs, referred to hear as documents, is included as part of the print job.

In FIG. 2, the server 10 multicasts the print job to each printer 12a–12n simultaneously. The network 14 must be able to understand and route data according to some multicasting protocol. Each printer then receives the entire print job. Embedded in the print job is information that assigns each printer a number of documents to create. The host will have formatted the document data related to the desired output document into the print job, as well as the assignment information. The host then transmits the print job.

In some embodiments of the invention, a store-and-forward device may reside on the network. The print job transmitted from the host may 'stop' at this store-and-forward device prior to being sent to a printer. However, if the print job does travel this path, it is still sent via multicast to at least two printers, with the store-and-forward device being an intermediate station for the temporary reception and storage of the transmission.

Figure 3:
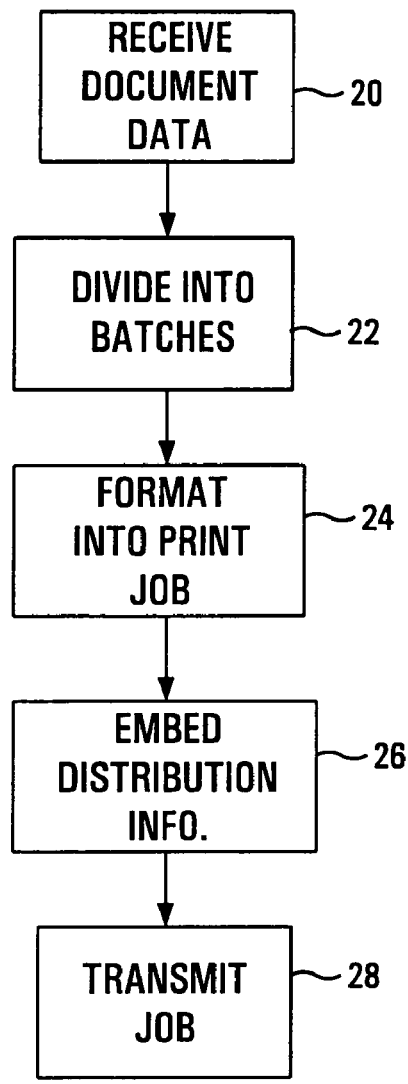
FIG. 3 shows a flowchart of one embodiment of a method to multicast documents in a cluster printing environment, in accordance with the invention.
Figure 4:
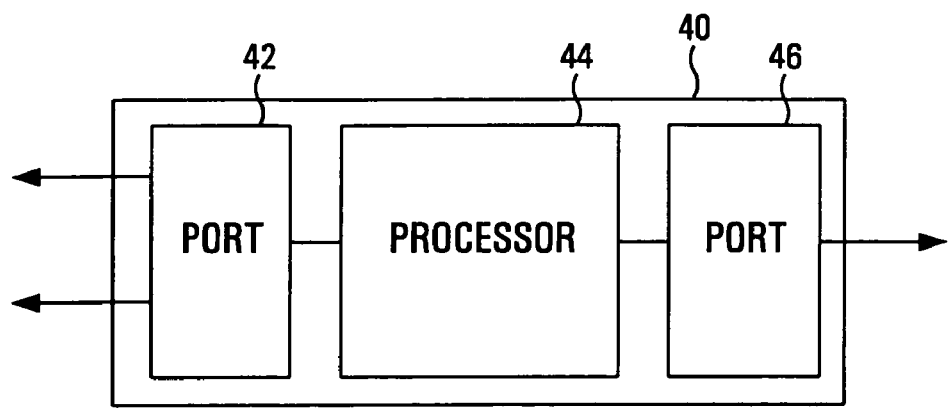
FIG. 4 shows an embodiment of a print host.

The method for creating and transmitting the print job can be seen in more detail in FIGS. 3 and 4. At 20, the host receives the document data. The host may be a computer, application software running on a computer, a scanner, or a printer. As discussed before, the term 'printer' includes printers, copiers, and fax machines as well as multi-function peripherals that have some or all of the same capabilities. Any of these can be a host. Again, the term 'printed' may include data printed from a file, a copier or scanner or a fax machine reception. The document data may include many different types of information. However, it will include the data necessary for the printing of the document as well as the number of documents to be created from the data.

The host then divides the number of documents to be created into at least two batches at 22. Each batch will be sent to a corresponding printer separate from the other printers used in producing the desired number of documents. The host then formats the document data relevant to the documents to be produced into a print job at 24. This can involve converting the document data into printer control language, which can be processed by the receiving printer, e.g. PCL5™, TIFF™, PostScript™ (PCL). The distribution information for the batches and the corresponding printers and their respective addresses is then embedded into the print job at 26. Finally, the job is transmitted at 28.

The host that performs these functions could be a printer or a computer. An example of such a device is shown in FIG. 4. The network device 40 has a port 42 through which the document data is received. The port 42 communicates with the processor 44. The processor 44 could be the central processing unit in a personal computer, a raster image processor on a printer or some other type of processor. The processor then performs the task of dividing up the number of documents requested into batches, formatting the print job, embedding the distribution information and then transmitting the job. Transmission of the job will be done through a port, either the same port 42 or another port 46.

In this manner, a large print job may be more efficiently processed without increasing the network traffic. For example, a printer or copier may need two hundred copies of one job. The host receives the document data. The reception could be across the network, within the same device, such as a printer or computer, or another application or part of application running on the same device. The host would then divide the 200 documents requested up into smaller batches. The size of the batches depends upon the capabilities of the various printers in the cluster. If, for example, there are ten printers each with the capability to print twenty documents, the batch size will be twenty.

The host then formats the data into the necessary format for printing and embeds the routing information into the print job. The routing information will include a list of printer identifiers and the assigned number of documents for each printer. The host then transmits the print job once. All the devices addressed in the embedded information access the job and produce their assigned number of copies.

In this manner, the cluster printing is accomplished without increasing the network traffic. Using the previous example, prior implementations would require that the document data be sent ten times. They may be some increase in the network traffic because of the extra information in the print job, but it will not be anywhere near the amount of traffic increase by sending the same job multiple times.

Thus, although there has been described to this point a particular embodiment for a method and structure for multicasting of documents for output, it is not intended that such specific references be considered as limitations upon the scope of this invention except in-so-far as set forth in the following claims.

What is claimed is:

1. A method for multicast document printing, the method comprising:
   receiving document data to be printed at a host, wherein said document data includes a number of copies of a document to be created from the document data;
   dividing the number of copies into a first batch associated with a first multicast group of at least two corresponding, separate printers and a second batch associated with a second multicast group of at least two corresponding, separate printers;
   allocating, from the first batch, first subsets to each of the at least two corresponding, separate printers of the first multicast group;
   allocating, from the second batch, second subsets to each of the at least two corresponding, separate printers of the second multicast group;
   formatting the document data into a first print job associated with the first multicast group and a second print job associated with the second multicast group;
   embedding instructions specific to each of the corresponding printers of the first multicast group into the first print job to form an entire first print job, the instructions indicating for each of the corresponding printers of the first multicast group the allocated first subset of copies to be printed by that printer;
   embedding instructions specific to each of the corresponding printers of the second multicast group into the second print job to form an entire second print job, the instructions indicating for each of the corresponding printers of the second multicast group the allocated second subset of copies to be printed by that printer;
   multicasting the entire first print job to the first multicast group and multicasting the entire second print job to the second multicast group;
   each of the at least two separate printers of the first multicast group receiving the entire first print job, the entire first print job including routing information comprising a list of printer identifiers and an assigned number of documents for each printer of the first multicast group; and
   each of the at least two separate printers of the second multicast group receiving the entire second print job, the entire second print job including routing information comprising a list of printer identifiers and an assigned number of documents for each printer of the second multicast group.

2. The method of claim 1, wherein the host is a printer.

3. The method of claim 1, wherein the host is application software resident in a printer.

4. The method of claim 1, wherein the host is a computer.

5. The method of claim 1, wherein the host is a scanner.

6. The method of claim 2, wherein the printer further comprises a multi-function peripheral.

7. The method of claim 2, wherein the printer further comprises a copier.

8. The method of claim 2, wherein the printer further comprises a fax machine.

9. A computer readable medium, said medium containing software code comprising:
- code operable to receive document data to be printed at a host, wherein said document data includes a number of copies of a document to be created from the document data;
- code operable to divide the number of copies to be created into a first batch associated with a first multicast group of one or more corresponding, separate printers and a second batch associated with a second multicast group of one or more corresponding, separate printers;
- code operable to allocate a portion of the first batch of copies to one printer of the first multicast group;
- code operable to allocate a portion of the second batch of copies to one printer of the second multicast group;
- code operable to format the document data into a first print job associated with the first multicast group and a second print job associated with the second multicast group;
- code operable to embed instructions specific to the allocated printer in the first group into the first print job batch and to form an entire first print job batch, the instructions indicating the allocated portion of copies to be printed by that printer;
- code operable to embed instructions specific to the allocated printer in the second group into the second print job batch and to form an entire second print job batch, the instructions indicating the allocated portion of copies to be printed by that printer; and
- code operable to request separate multicast transmissions of the entire first print job having the instructions specific to the allocated printer to the first group and the entire second print job having the instructions specific to the allocated printer to the second group.

10. The medium of claim 9, wherein the computer readable medium is read by a computer.

11. The medium of claim 9, wherein the computer readable medium is read by a printer.

12. The medium of claim 9, wherein the medium is a diskette.

13. The medium of claim 9, wherein the medium is a compact disc.

14. The medium of claim 9, wherein the medium is a network-accessible file.

15. A network device, comprising:
- a port operable to receive document data to be printed at a host, wherein said document data includes a number of copies of a document to be created from the document data;
- a processor in communication with the port, operable to:
- divide the number of copies to be created into a first batch associated with a first multicast group of one or more corresponding, separate printers and a second batch associated with a second multicast group of one or more corresponding, separate printers,
- allocate a portion of the first batch of copies to one printer of the first multicast group,
- allocate a portion of the second batch of copies to one printer of the second multicast group,
- format the document data into a first print job associated with the first multicast group and a second print job associated with the second multicast group,
- embed instructions specific to the allocated printer in the first group into the first print job batch and to form an entire first print job batch, the instructions indicating a number of copies to be printed by that allocated printer,
- embed instructions specific to the allocated printer in the second group into the second print job batch and to form an entire second print job batch, the instructions indicating a number of copies to be printed by that allocated printer; and
- a communications port operable to multicast the entire first print job having the instructions specific to the allocated printer to the first group and the entire second print job having the instructions specific to the allocated printer to the second group.

16. The network device of claim 15, wherein the network device is a computer.

17. The network device of claim 15, wherein the network device is a printer.

18. The network device of claim 15, wherein the processor is a raster image processor.

19. A printing system comprising:
- means for receiving document data to be printed at a host, wherein said document data includes a number of copies of a document to be created from the document data;
- means for dividing the number of copies into a first batch associated with a first multicast group of at least two corresponding, separate printers and a second batch associated with a second multicast group of at least two corresponding, separate printers;
- means for allocating, from the first batch, first subsets to each of the at least two corresponding, separate printers of the first multicast group;
- means for allocating, from the second batch, second subsets to each of the at least two corresponding, separate printers of the second multicast group;
- means for formatting the document data into a first print job associated with the first multicast group and a second print job associated with the second multicast group;
- means for embedding instructions specific to each of the corresponding printers of the first multicast group into the first print job to form an entire first print job, the instructions indicating for each of the corresponding printers of the first multicast group the allocated first subset of copies to be printed by that printer;
- means for embedding instructions specific to each of the corresponding printers of the second multicast group into the second print job to form an entire second print job, the instructions indicating for each of the corresponding printers of the second multicast group the allocated second subset of copies to be printed by that printer;
- means for multicasting the entire first print job to the first multicast group and multicasting the entire second print job to the second multicast group;
- means for each of the at least two separate printers of the first multicast group receiving the entire first print job, the entire first print job including routing information comprising a list of printer identifiers and an assigned number of documents for each printer of the first multicast group; and
- means for each of the at least two separate printers of the second multicast group receiving the entire second print job, the entire second print job including routing information comprising a list of printer identifiers and an assigned number of documents for each printer of the second multicast group.

* * * * *